United States Patent
Kumazaki et al.

(10) Patent No.: US 6,731,666 B1
(45) Date of Patent: May 4, 2004

(54) LASER DEVICE

(75) Inventors: Takahito Kumazaki, Hiratsuka (JP); Takeshi Ohta, Oyama (JP)

(73) Assignee: Komatsu Ltd., Tokyo (JP)

( * ) Notice: Subject to any disclaimer, the term of this patent is extended or adjusted under 35 U.S.C. 154(b) by 224 days.

(21) Appl. No.: 09/621,140

(22) Filed: Jul. 20, 2000

(51) Int. Cl.$^7$ ................................................. H01S 3/08
(52) U.S. Cl. .................... 372/99; 372/100; 372/102; 372/103
(58) Field of Search .............................. 372/92, 98, 99, 372/100, 102, 103, 106, 108, 9

(56) References Cited

U.S. PATENT DOCUMENTS 4,173,001 A * 10/1979 Koepf ........................ 372/106
4,985,898 A * 1/1991 Furuya et al. ............... 372/106

FOREIGN PATENT DOCUMENTS

JP    2531788    6/1996

* cited by examiner

Primary Examiner—Minh-Loan Tran
(74) Attorney, Agent, or Firm—Armstrong, Kratz, Quintos, Hanson & Brooks, LLP.

(57) ABSTRACT

A laser device capable of efficiently oscillating laser light and always obtaining a stable beam form is provided. For this purpose, in the laser device including an amplifying section (18) in which a laser medium is amplified to oscillate laser light (11), and an optical element for separating part of the laser light (11) oscillated, and shaping a beam form of the laser light (11) into a desired form to output the same, wherein the optical element has at least either one of a partial reflecting portion (26) for partially reflecting the laser light (11) or a non-reflective portion (28) for transmitting the laser light (11) at high transmissivity, each of which is provided on approximately a center portion, and a total reflecting portion (27) which is provided outside a perimeter of the partial reflecting portion (26) or the non-reflective portion (28), and which reflects the laser light (11) at high reflectivity.

2 Claims, 8 Drawing Sheets ium is excited. As a result, even if the shape of the discharge area 18 is varied as a result of consumption of the discharge electrodes 5 and 5, the laser light 11 passing through the openings 16A and 17A can obtain a stable beam form.
LASER DEVICE

TECHNICAL FIELD

The present invention relates to a laser device, and particularly relates to a laser device having an optical element for shaping a beam form of laser light into a desired form.

BACKGROUND ART

Conventionally, in a narrow band excimer laser device and fluorine laser device, a slit for shaping a sectional form of laser light into a predetermined form is known, and it is disclosed, for example, in Japanese Patent No. 2531788. FIG. 13 shows a configuration of an excimer laser device according to the prior art. It should be noted that FIG. 13 is made by being reversed horizontally relative to the drawing made in the aforementioned Patent. In FIG. 13, the excimer laser device 1 is seen from above, and in the explanation hereinafter, an up and down direction of the paper surface of FIG. 13 is called a lateral direction, and a direction vertical to the paper surface is called a vertical direction.

In FIG. 13, an excimer laser device 1 includes a laser chamber 2 containing laser gas being a laser medium at a predetermined pressure ratio, and inside the laser chamber 2, discharge electrodes 5 and 5 are placed to oppose to each other in the aforementioned vertical direction. High voltage is applied across the aforementioned discharge electrodes 5 and 5 from a high voltage power supply not illustrated to initiate discharge, and thereby the laser medium is excited in a discharge area 18 to oscillate laser light 11.

The laser light 11 excited in the laser chamber 2 is outputted from a rear window 9 toward the rear (the left side in FIG. 13), and its bandwidth is narrowed by a grating 23 so that a spectrum width of the laser light 11 become narrow. The laser light 11 with its bandwidth being narrowed enters the laser chamber 2 again from the rear window 9, and it outputted from the excimer laser device 1 through a front window 7 and a front mirror 38 to become a light source for processing of a processing unit such as a stepper or the like not illustrated.

In this situation, partial reflection coating for partially reflecting part of the laser light 11 at a predetermined ratio and transmitting and outputting the rest of the laser light 11 is applied on an entire surface of the front mirror 38 to the side of the laser chamber 2, and defines a partial reflecting element 26. The laser light 11 which is partially reflected by the front mirror 38 returns to the inside of the laser chamber 2, and is amplified again by discharge in the discharge area 18.

In front of and behind the laser chamber 2, placed are a front slit 16 and a rear slit 17 (described as "aperture" in the aforementioned Japanese Patent No. 2531788) having a rectangular front opening 16A and rear opening 17A respectively. In the above prior art, the front slit 16 and the rear slit 17 correspond to optical elements for shaping the beam form of the laser light 11 into a desired form.

In the excimer laser device 1, part of the laser light 11 is cut by the aforementioned slits 16 and 17, and the sectional form of the laser light 11 is shaped into the form of the openings 16A and 17A so that the sectional form of the laser light 11 corresponds to a form required by a processing unit. Hereinafter, the sectional form of the laser light 11 is called a beam form.

The rear slit 17 shapes the beam form of the laser light 11 traveling rearward, thereby preventing disturbance of the wave surface caused by the laser light 11 hitting an end portion of the grating 23.

However, the aforementioned prior art has the disadvantage described below.

FIG. 14 shows a view taken along the 14—14 line in FIG. 13. It should be noted that the aforementioned lateral direction is represented as the left and right direction in FIG. 14. The illustration of the front window 7 is omitted. FIG. 15 shows a detailed configuration of the area near the front and the rear windows 7 and 9 of the excimer laser device 1.

As shown in FIG. 14, both the front opening 16A and the rear opening 17A according to the prior art are narrower than the discharge area 18 in which the laser medium is excited. As a result, even if the shape of the discharge area 18 is varied as a result of consumption of the discharge electrodes 5 and 5, the laser light 11 passing through the openings 16A and 17A can obtain a stable beam form.

However, as a result that the openings 16A and 17A are made narrower than the discharge area 18, as shown in FIG. 15, surplus laser light 11A, which is oscillated at the outer peripheral side of the discharge area 18 than the openings 16A and 17A, is cut by the slits 16 and 17. Thus, out of the discharge energy inputted into the discharge area 18, a part of it becomes a loss such as heat or the like and is not taken out as the laser light 11, which causes the disadvantage of reducing the efficiency of the excimer laser device 1.

Further, as shown in FIG. 15, the surplus laser light 11A is outputted to areas close to the openings 16A and 17A of the slits 16 and 17. Thus, the temperature in the areas close to the openings 16A and 17A of the slits 16 and 17 rise and thereby refractive index of the gas inside the openings 16A and 17A is varied, thus causing the disadvantage of the wave surface of the laser light 11 being disturbed. Furthermore, heat occurs in the areas close to the openings 16A and 17A of the slits 16 and 17 causes the slits 16 and 17 to have heat, which causes the disadvantage that impurities occurring there stain and damage the other optical components.

Further, in the rear slit 17, as shown in FIG. 15, the rear opening 17A is made smaller than the front opening 16A. Thereby, a part 11C of the laser light 11, which is partially reflected by the front mirror 38, passes through the front opening 16A, and returns to the discharge area 18, cannot pass through the rear opening 17A and is cut, thus further increasing the loss.

SUMMARY OF THE INVENTION

The present invention is made to eliminate the disadvantages of the above art, and its object is to provide a laser device capable of efficiently oscillating laser light and always obtaining a stable beam form.

In order to attain the above object, a first configuration of a laser device according to the present invention is in a laser device including an amplifying section in which a laser medium is amplified to oscillate laser light, and an optical element for separating part of the laser light oscillated in the amplifying section, and shaping a beam form of the laser light into a desired form to output the same, the configuration in which the optical element has at least either one of a partial reflecting portion for partially reflecting the laser light or a non-reflective portion for transmitting the laser light at high transmissivity, each of which is provided on approximately a center portion, and a total reflecting portion which is provided outside a perimeter of said partial reflecting portion or said non-reflective portion, and which reflects the laser light at high reflectivity.

According to the above configuration, by allowing the laser light to pass through the partial reflecting portion or the non-reflective portion of the optical element, the beam form of the laser light to be outputted is shaped into the shape of the partial reflecting portion or the non-reflective portion. Recycle laser light separated by the optical element is reflected at the total reflecting portion with high reflectivity and returns to the amplifying section, where it contributes to laser oscillation. Accordingly, energy of the separated laser light is not lost, thus improving the energy efficiency of the laser device relative to the energy inputted for excitation.

A second configuration of the laser device according to the present invention is in a laser device including an amplifying section in which a laser medium is amplified to oscillate laser light, the configuration including a front mirror having a partial reflecting portion which is provided on approximately a center portion and partially reflects the laser light, and a total reflecting portion which is provided outside a perimeter of the partial reflecting portion and reflects the laser light at high reflectivity, in which the front mirror separates part of the laser light oscillated in the amplifying section, and shapes a beam form of the laser light into a desired form to output the same.

According to the above configuration, by outputting the laser beam from the partial reflecting portion provided on approximately the center of the front mirror, the beam form of the laser beam is shaped. Since the total reflecting portion is provided outside the perimeter of the partial reflecting portion, the laser light passing the portion outside the partial reflecting portion is reflected at the total reflecting portion with high reflectivity and returns to the amplifying section, where it contributes to the laser oscillation again. Accordingly, the energy loss of the laser light decreases, thus improving the energy efficiency of the laser device.

Further, in the present invention, since the front mirror also plays the role of the front slit placed between the front mirror and the laser chamber in the prior art, the front slit becomes unnecessary, thus reducing the number of components. In addition, since it is not necessary to place the front slit, the distance between the front mirror and the laser chamber is reduced, thus making the resonator length of the laser device shorter. Thereby, the laser device is reduced in size, and the loss in the resonator is reduced, thus increasing the power of the laser light.

A third configuration of the laser device according to the present invention is in a laser device including an amplifying section in which a laser medium is amplified to oscillate laser light, the configuration including a prism having a non-reflective portion which is provided on approximately a center portion and transmits the laser light at high transmissivity, and a total reflecting portion which is provided outside a perimeter of the non-reflective portion and reflects the laser light at high reflectivity, in which the prism separates part of the laser light oscillated in the amplifying section, and shapes a beam form of the laser light into a desired form to output the same.

According to the above configuration, by allowing the laser light to transmit the non-reflective portion of the prism, the beam form is shaped, and the laser light entering the total reflecting portion is separated and removed. Accordingly, in the present invention, the prism plays the role of "the rear slit placed between the laser chamber and the prism" which is the conventionally ordinary configuration, thus making the rear slit unnecessary and reducing the number of components. As a result, the resonator length becomes smaller, the laser device is reduced in size and the loss in the resonator is reduced, thus increasing the power of the laser light. It should be noted that the configuration further including the front mirror in the aforementioned second configuration may be suitable. According to this configuration, the same operational effects as in the aforementioned second configuration is added.

A fourth configuration of the laser device according to the present invention is in a laser device including an amplifying section in which a laser medium is amplified to oscillate laser beam, a front slit and a rear slit which are provided to sandwich the amplifying section between them, and which separate part of oscillated laser light from the laser light and shape a beam form into a desired form to output the same, and a front mirror for partially transmitting the laser light oscillated in the amplifying section to output the same, the configuration in which the aforementioned front mirror has a low transmission portion with low transmissivity of the laser light, formed on approximately a center portion, and a high transmission portion with high transmissivity of the laser light, formed outside a perimeter of the low transmission portion.

According to the above configuration, of the laser light passing through an opening of the front slit, components which are conventionally partially reflected at the front mirror and cut by the rear slit pass through the portion with high transmissivity in the outer peripheral portion of the front mirror to be outputted outside. Accordingly, the components cut by the rear slit decrease, thus reducing the energy loss of the laser light, and improving the energy efficiency of the laser device.

BEST MODE FOR CARRYING OUT THE INVENTION

A preferred embodiment of the present invention will be explained with reference to the drawings.

Figure 1:
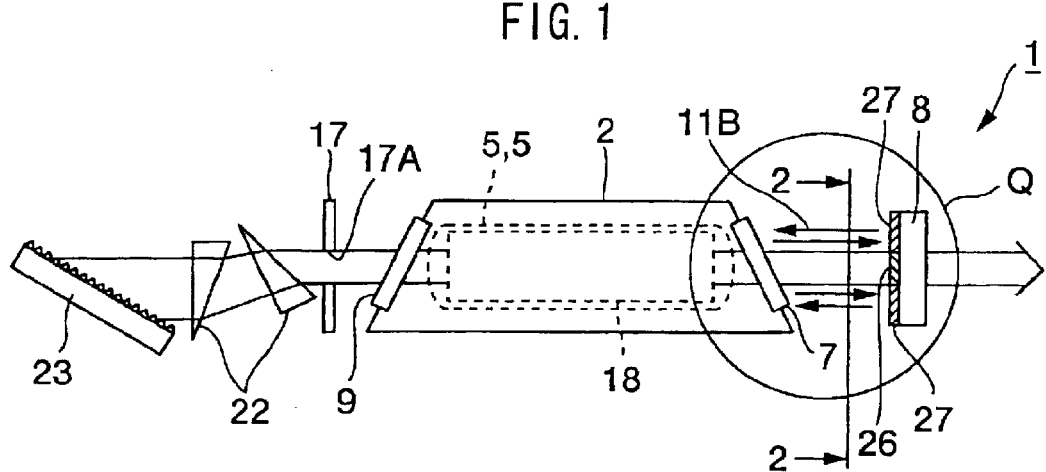
FIG. 1 is an explanatory view showing a configuration of an excimer laser device according to a first embodiment of the present invention.

Initially, a first embodiment will be explained. FIG. 1 shows a configuration of an excimer laser device according to the first embodiment. In FIG. 1, an excimer laser device 1 is seen from above.

In FIG. 1, the excimer laser device 1 includes a laser chamber 2 containing laser gas serving as a laser medium at a predetermined pressure ratio. Inside the laser chamber 2, discharge electrodes 5 and 5 are placed to oppose to each other in a vertical direction. From high voltage power supply not illustrated, high voltage is applied across the discharge electrodes 5 and 5 to initiate discharge in a discharge area 18, thereby exciting the laser medium to oscillate laser light 11. The discharge area 18 is an amplifying section of the excimer laser device 1.

The laser light 11 oscillated in the laser chamber 2 is outputted rearward (left side in FIG. 1) from a rear window 9, and a beam width thereof is expanded by prisms 22 and 22, and a band width thereof is narrowed so that a spectrum width of wavelength is made narrower by a grating 23. The laser light 11 of which bandwidth is narrowed enters the laser chamber 2 from the rear window 9 again, passes through a front window 7, and is partially reflected by a front mirror 8. Part of the laser light 11 which is partly reflected returns to the laser chamber 2, where it is amplified again in the discharge area 18, and the rest of the laser light 11 is outputted from the excimer laser device 1 to become a light source for processing of a processing unit such as a stepper not illustrated.

Figure 2:
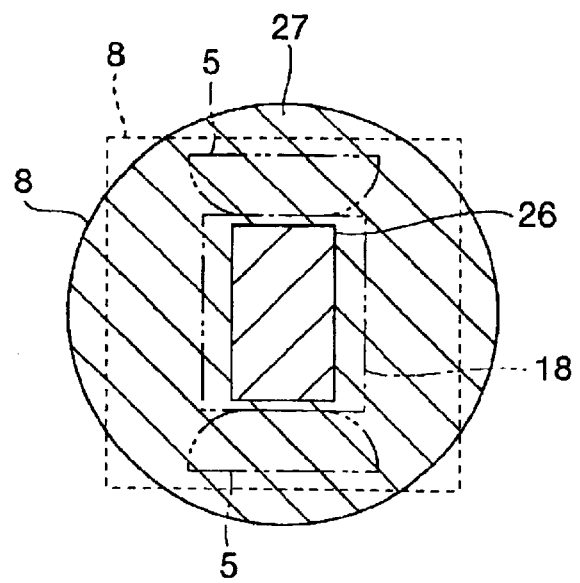
FIG. 2 is an explanatory view taken along the line 2—2 in FIG. 1.

A view seen in the direction of the line 2—2 in FIG. 1 is shown in FIG. 2. In FIG. 2, onto approximately a center portion of a surface, which is at the laser chamber 2 side, of the front mirror 8 having the circular-shaped outer peripheral portion, applied is partial reflection coating which partially reflects the laser light 11 at a predetermined ratio and transmits the rest of the light, which defines a partial reflecting portion 26. Further, onto an area around the partial reflecting portion 26, applied is total reflection coating for reflecting the laser light 11 at high reflectivity, which defines a total reflecting portion 27. In this situation, as for the high reflectivity, the reflectivity not less than 90% is preferable. Further, since the higher the reflectivity is, the less the loss of the laser light 11 becomes, the higher the reflectivity (the closer to 100%) is, the more preferable it is.

Figure 3:
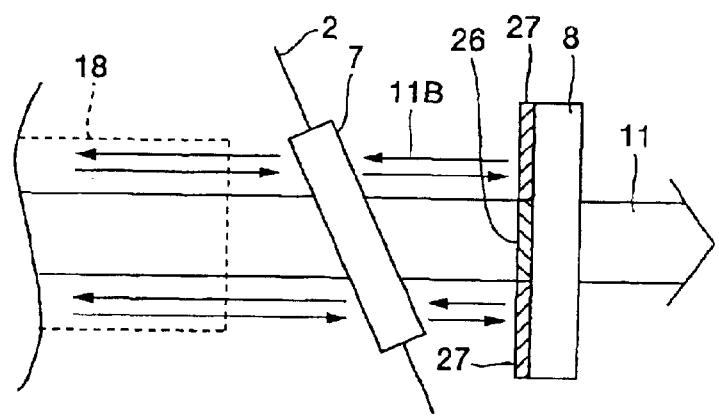
FIG. 3 is a detailed view of the portion Q in FIG. 1.

In FIG. 3, a detailed view of the portion Q in FIG. 1 is shown. In FIG. 3, the laser light 11 passing through the partial reflecting portion 26 of the front mirror 8 is shaped into a form of the partial reflecting portion 26 and is outputted forward (rightward direction in FIG. 3). Meanwhile, a component 11B passing the outer peripheral portion of the laser light 11 is reflected by the total reflecting portion 27 of the front mirror 8 and returns to the inside of the laser chamber 2 as recycle laser light 11B. After it is amplified by discharge in the discharge area 18, it is outputted as the laser light 11. In this situation, when the reflectivity of the total reflecting portion 27 of the front mirror 8 is higher, the loss of the laser light 11 becomes less, and the energy efficiency is improved.

As explained above, according to the first embodiment, the partial reflecting portion 26 for reflecting part of the laser light 11 is provided on approximately the center portion of the front mirror 8, and the total reflecting portion 27 for reflecting the laser light 11 with high reflectivity is provided outside the perimeter of the partial reflecting portion 26. Thus, the laser light 11 passes through the partial reflecting portion 26 to be shaped into the shape of the partial reflecting portion 26.

Figure 14:
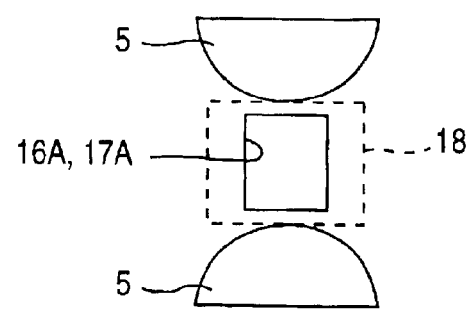
FIG. 14 is a view taken along the line 14—14 in FIG. 13.
Figure 15:
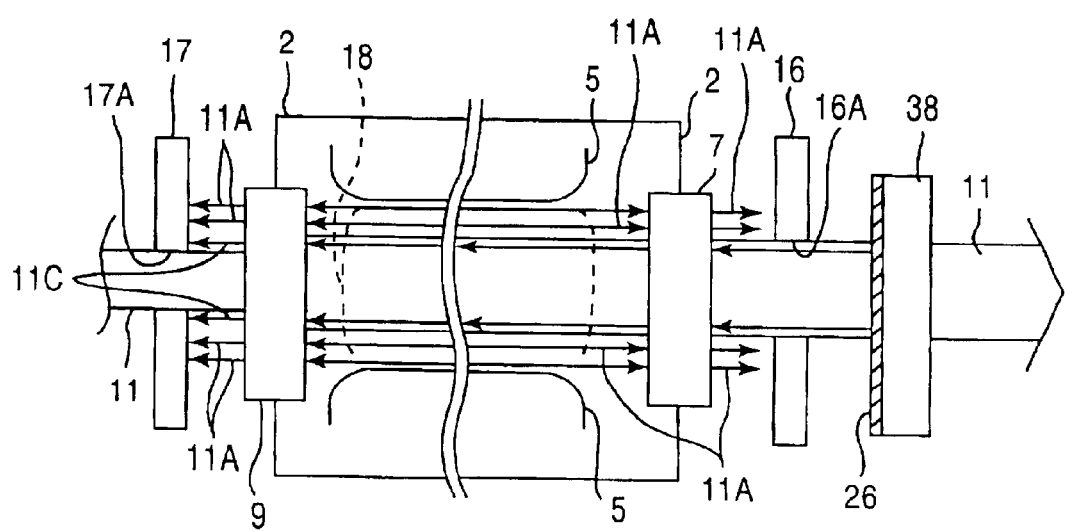
FIG. 15 is an explanatory view showing a detailed configuration of an area near a front and rear window in the excimer laser device in FIG. 13.

Of the laser light 11 oscillated by discharge, the recycle laser light 11B not outputted is reflected by the total reflecting portion 27 to return to the inside of the laser chamber 2, where it is amplified again in the discharge area 18. Accordingly, part of the laser light 11 is not thrown away as surplus laser light 11A (See FIG. 14), and of the energy inputted to discharge, the ratio of the energy which can be taken out as the laser light is increased. As a result, energy efficiency of the excimer laser device 1 is improved, which leads to an increase in power.

Specifically, unlike the aforementioned conventional front mirror 38, the front mirror 8 of the present embodiment includes the function of the ordinary front mirror 38 and the function of the optical element (for example, a front slit 16 in FIG. 12) for shaping a beam form of the laser light 11 into a desired form. As a result, the front slit 16 is not necessary, thus decreasing the number of components, and a resonator length between the grating 23 and the front mirror 8 is made smaller. Thereby, the excimer laser device 1 decreases in size. In addition, with the discharge area 18 being the same and the resonator length being smaller, the power of the laser light 11. emitted increases. Further, since the partial reflecting portion 26 and the total reflecting portion 27 are formed by coating, they can be formed not to absorb the laser light 11, and thus it never happens that heat concentrates on the border of the both of them. Specifically, the wave surface of the laser light 11 is not disturbed.

Further, in this situation, it is preferable to form the surface of the front mirror 8 to the laser chamber 2 side to be a concave surface having a predetermined curvature radius. As a result of forming it to be the concave surface, the recycle laser light 11B reflected at the total reflecting portion 27 of the front mirror 8 is prevented from being widened by diffraction to go out of the discharge area 18, thus making it possible to return more recycle laser light 11B into the discharge area 18.

Figure 4:
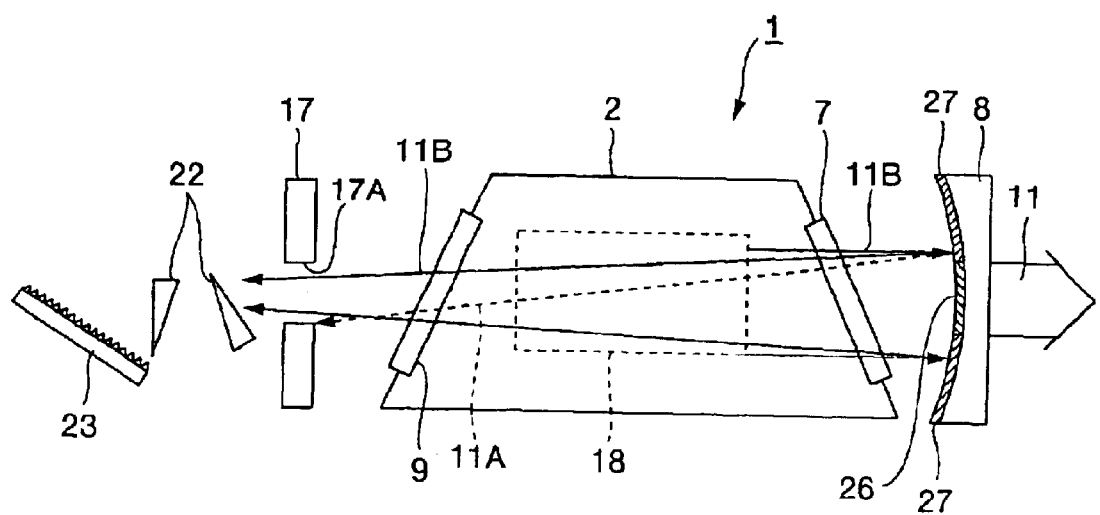
FIG. 4 is an explanatory view showing another configuration example of the excimer laser device according to the first embodiment.

Further, as shown in FIG. 4, it is suitable to set the curvature radius of the front mirror 8 so that all the recycle laser light 11B reflected at the total reflecting portion 27 enters a rear opening 17A. By setting the curvature radius as above, all the recycle laser light 11B reflected at the total reflecting portion 27 enters the grating 23, and is not cut by a rear slit 17 or the like. Consequently, since all the recycle laser light 11B contributes to the power of the laser light 11 to be outputted, the loss is further decreased, thus improving energy efficiency. If the curvature radius of the front mirror 8 is made too small, the surplus laser light 11 A reflected at an upper curved surface, shown by the broken line, is cut at a lower portion of the rear slit 17, and therefore it is necessary that the curvature radius of the front mirror 8 is not made too small.

Instead of making the front mirror 8 have the curved surface with the same curvature radius in a lateral and vertical direction, it is suitable to make it in a cylindrical form having a curved surface only in one direction, or in a toroidal form having different curvature radiuses in the lateral direction and the vertical direction. Further, the form of the curved surface is not limited to the spherical curbed surface, but it may be in an aspheric form.

Means for manufacturing the total reflecting portion 27 and the partial reflecting portion 26 is not limited to coating. Though it is explained that coating is applied onto the front mirror 8 to the laser chamber 2 side, but it is not restrictive, and coating may be applied onto the side opposite to the laser chamber 2. Further, the form of the outer peripheral portion of the front mirror 8 is not limited to circular. For example, as shown in the broken line 8 in FIG. 2, if the outer peripheral form is made to be a quadrangle with its four sides parallel to those of the partial reflecting portion 26, the gradient of the partial reflecting portion 26 can be easily found, and thus it is easy to align the partial reflecting portion 26 with the discharge area 18 and the discharge electrodes 5 and 5.

Figure 5:
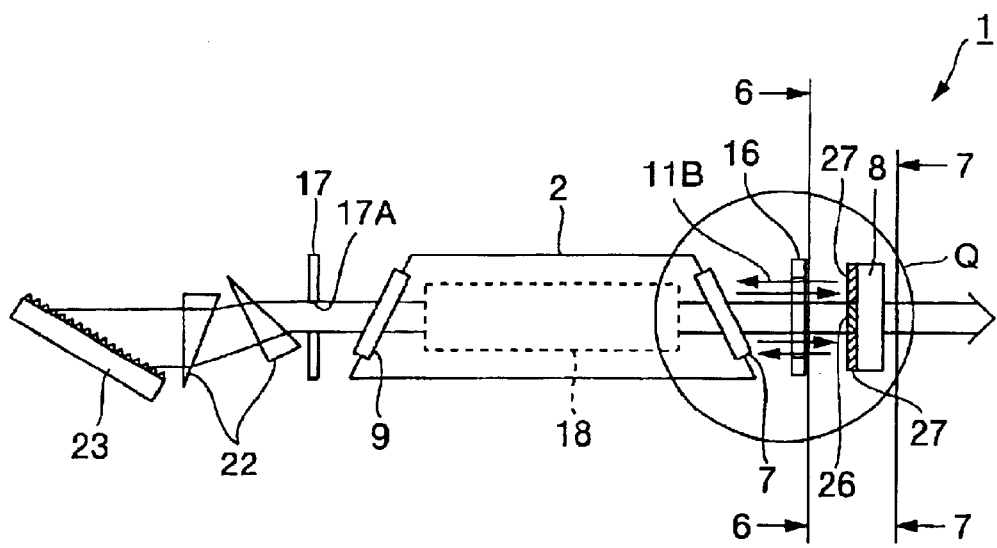
FIG. 5 is an explanatory view showing a configuration of an excimer laser device according to a second embodiment of the present invention.
Figure 6:
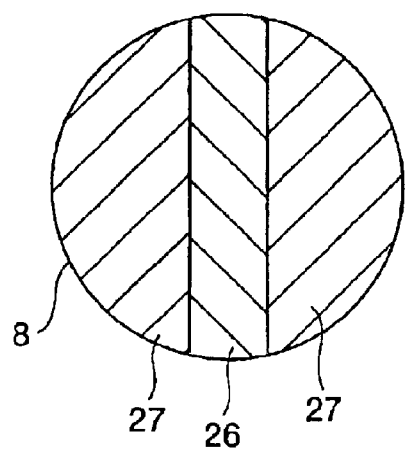
FIG. 6 is a view taken along the line 6—6 in FIG. 5.

Next, a second embodiment will be explained. In FIG. 5, a configuration of the excimer laser device 1 according to the second embodiment will be shown. In FIG. 6, a view taken along the line 6—6 is shown, and in FIG. 7, a view taken along the line 7—7 is shown.

In FIG. 6, partial reflection coating in a bar form extending in a vertical direction is applied onto approximately a center portion in a lateral direction of the front mirror 8 to define the partial reflecting portion 26, and total reflection coating is applied onto both left and right sides of the partial reflecting portion 26 to define the total reflecting portion 27.

Figure 7:
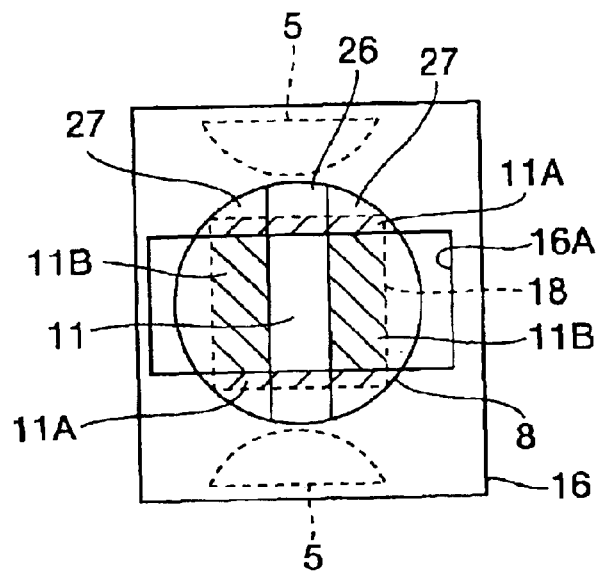
FIG. 7 is a view taken along the line 7—7 in FIG. 5.

As shown in FIGS. 5 and 7, the front slit 16 having a front opening 16A is placed between the laser chamber 2 and the front mirror 8. A lateral dimension of the front opening 16A is larger than a lateral width of the partial reflecting portion 26 of the front mirror 8, and a vertical dimension thereof corresponds to a vertical dimension of a desired beam form.

As shown in FIG. 7, the laser light 11 is laterally limited by the lateral width of the partial reflection coating of the front mirror, and is vertically limited by the vertical width of the front opening 16A, thus determining the beam form. Accordingly, as shown in FIGS. 5 and 7, the laser light 11 oscillated in the discharge area 18, which extends off the partial reflecting portion 26 to the left and right in the lateral direction, is reflected by the total reflection coating of the front mirror 8 and returns to the discharge area 18 to become the recycle laser light 11B. On the other hand, the laser light 11 oscillated in the discharge area 18, which extends off the front opening 16A up and down in the vertical direction, is cut by the front slit 16, and is thrown away as the surplus laser light 11A.

Thus, according to the second embodiment, the energy efficiency is decreased more than the excimer laser device 1 according to the first embodiment by the amount of the surplus laser light 11A cut by the front slit 16. However, in the first embodiment, the position of the partial reflecting portion 26 of the front mirror 8 has to be laterally and vertically aligned with the discharge area 18 inside the laser chamber 2, and the alignment requires much time and efforts.

On the other hand, in the second embodiment, the front mirror 8 and the discharge area 18 are initially aligned in the lateral direction, and independently of this, the front slit 16 and the discharge area 18 are aligned in the vertical direction, thus providing the characteristic in which the alignment is easy. In the above alignment, in order to align the optical axis of the laser, the positioning of the front mirror 8 is performed at first. Subsequently, the placement position of the laser chamber 2 is adjusted to correspond to the position of the front mirror 8, thereby aligning the front mirror 8 and the discharge area 18 in the lateral direction. Then the front slit 16 and the discharge area 18 are aligned in the vertical direction. Further, the partial reflecting portion 26 of the front mirror 8 is formed into a bar shape, thus reducing time and effort taken, for example, for masking during coating compared to the partial reflecting portion 26 formed into a rectangular shape, and making it easy to manufacture the front mirror 8.

Figure 8:
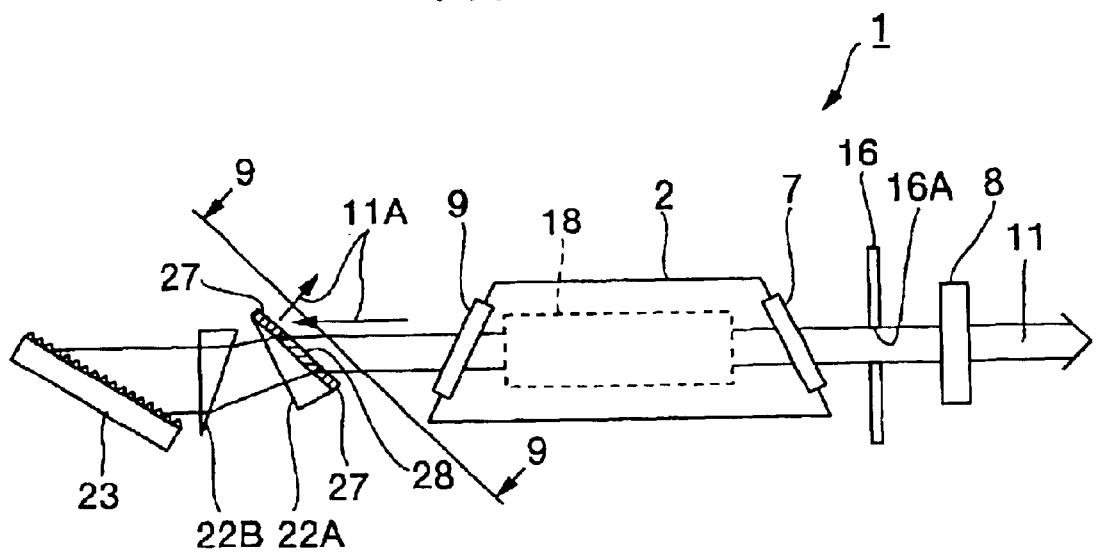
FIG. 8 is an explanatory view showing a configuration of an excimer laser device according to a third embodiment of the present invention.
Figure 9:
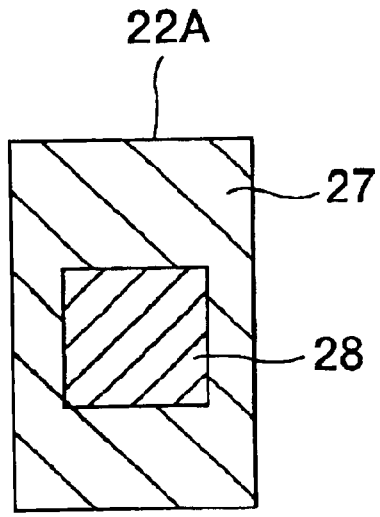
FIG. 9 is a view taken along the line 9—9 in FIG. 8.

Next, a third embodiment will be explained. In FIG. 8, a configuration of the excimer laser device 1 according to the third embodiment will be shown. In FIG. 8, a first and second prisms 22A and 22B are disposed behind the laser chamber 2. In FIG. 9, a view taken along the line 9—9 in FIG. 8 is shown. As shown in FIG. 9, onto approximately a center portion of a surface facing to the laser chamber 2 of the first prism 22A, applied is rectangular non-reflective coating for transmitting the laser light 11 with high transmissivity, which defines a non-reflective portion 28. Total reflection coating is applied onto a portion outside the non-reflective portion 28, which defines the total reflecting portion 27.

The non-reflective portion 28 may be formed without the non-reflective coating being applied thereon. For example, by using CaF2 with high transmissivity as the material of the prism 22A, the non-reflection coating can be omitted in the non-reflective portion 28. In this case, the non-reflective portion 28 is formed without the non-reflective coating being applied thereon, it does not happen that the non-reflective coating is deteriorated by the emission of the laser light 11, thus improving the durability of the prism 22A against the laser light 11.

It is desirable that the reflectivity of the non-reflective portion 28 is not more than 5%. For example, when the non-reflective portion 28 is formed without the non-reflective coating being applied thereon, if it is assumed that the material of the prism 22A is CaF2 and the wavelength of the laser light 11 is the wavelength of 157 nm which is oscillated from a fluoride laser device, Fresnel reflectivity of the prism 22A is 4.8%. Accordingly, by setting the reflectivity to be lower than the Fresnel reflectivity, the loss of the laser light 11 is reduced, thus making it possible to further improve the energy efficiency of the excimer laser device 1.

As a result, of the laser light 11 emitted into the first prism 22A, the components passing through the non-reflective portion 28 are shaped into the same shape of the non-reflective portion 28. On the other hand, the components passing the peripheral portion of the laser light 11 are reflected at the total reflecting portion 27 and become the surplus laser light 11A to be removed outside the optical path of the laser light 11.

Specifically, unlike the prism 22 of the first embodiment, the first prism 22A of the present embodiment includes the function of the ordinary prism 22 and the function of the optical element for shaping the beam form of the laser light 11 into a desired form (for example, the rear slit 17 in FIG. 1). In this manner, the first prism 22A plays the role of the rear slit 17, thus making the rear slit 17 unnecessary. Accordingly, compared with the first embodiment, the resonator length can be reduced, thus reducing the excimer laser device 1 in size and increasing the power of the emitting laser light 11. Further, it prevents the disadvantage as in the prior art, in which the portion of the rear slit 17 close to the rear opening 17A is heated to vary the refractivity of the gas to thereby disturb the wave surface of the laser light 11.

It should be noted that the third embodiment can be carried out simultaneously with the aforementioned first or second embodiment. For example, if it is carried out at the same time with the first embodiment, the front and the rear slits 16 and 17 become unnecessary, thus further reducing the resonator length to reduce the excimer laser device 1 in size, which increases the power of the laser light 11. Further, if it is carried out at the same time with the second embodiment, operational effects of the third embodiment can be obtained in addition to the operational effects of the second embodiment.

Figure 10:
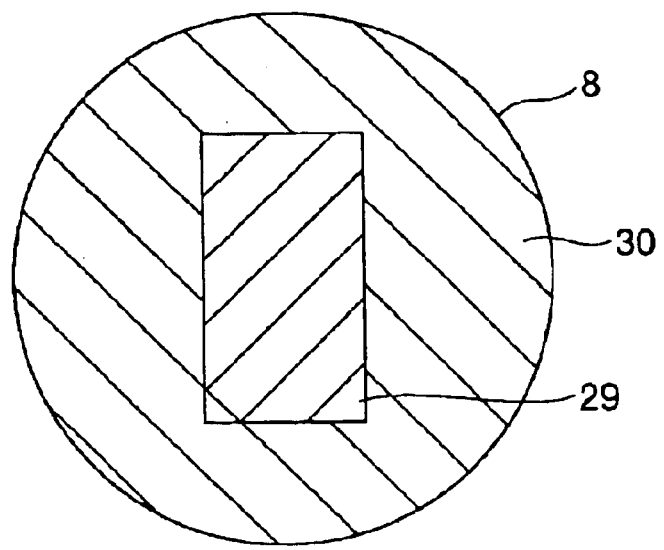
FIG. 10 is an explanatory view of a front mirror according to a fourth embodiment of the present invention.

Next, a fourth embodiment will be explained. In FIG. 10, the front mirror 8 according to the fourth embodiment is shown. Onto approximately a center portion of a surface of the front mirror 8 to the side of the laser chamber 2 (See FIG. 11), applied is a rectangular partial reflection coating, which defines a low transmission portion 29. Outside a perimeter of the low transmission portion 29, applied is partial reflection coating with higher transmissivity than the low transmission portion 29, or non-reflective coating, which defines a high transmission portion 30.

Figure 11:
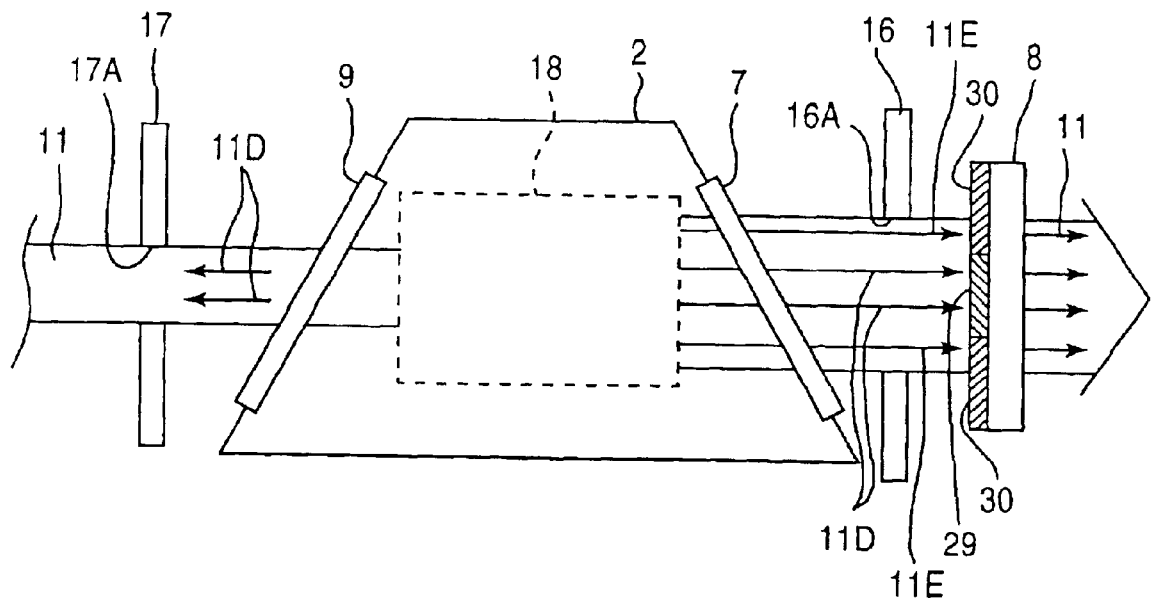
FIG. 11 is an explanatory view showing a configuration of an excimer laser device according to the fourth embodiment.
Figure 13:
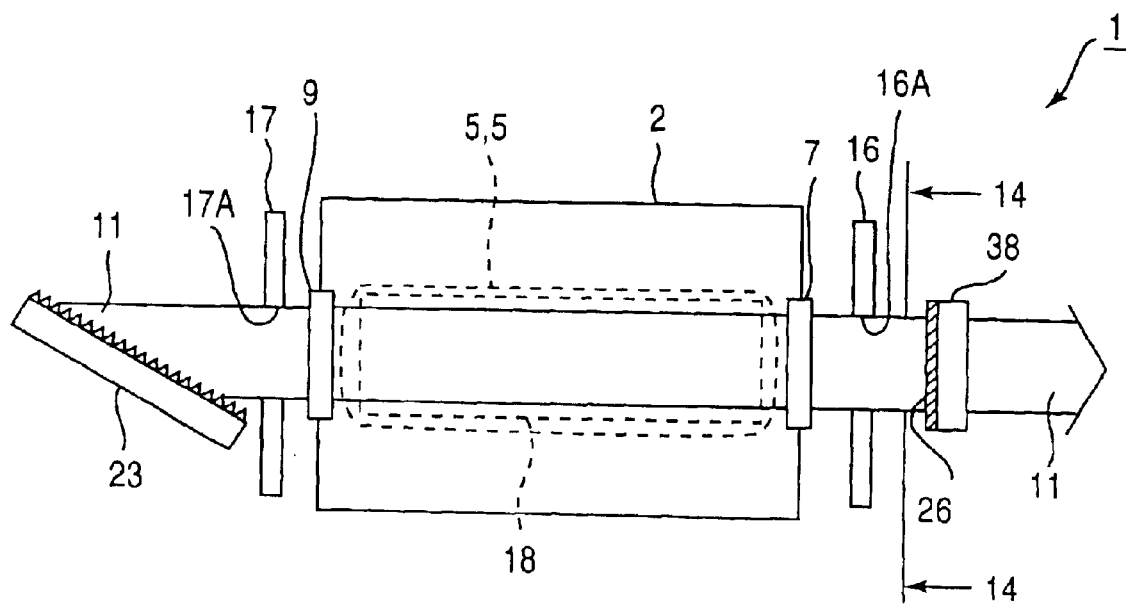
FIG. 13 is an explanatory view showing a configuration of an excimer laser device according to a prior art.

In FIG. 11, a configuration of the excimer laser device 1 in which the front mirror 8 shown in FIG. 10 is used is shown. Of the laser light 11 outputted from the front opening 16A of the front slit 16, components 11D passing approximately the center is partly reflected at the low transmission portion 29 to return into the laser chamber 2, where they are amplified again in the discharge area 18. Components 11E transmitting the peripheral portion of the front opening 16A passes through the high transmission portion 30 of the front mirror 8 and are outputted outside the excimer laser device 1.

As explained above, according to the fourth embodiment, the components 11E of the laser light 11 passing through the peripheral portion of the front opening portion 16A are not reflected by the front mirror 8, but are taken outside the excimer laser device 1. As a result, the disadvantage that the components 11C (See FIG. 14) of the laser light 11 passing through the peripheral portion of the front opening 16A are reflected by the front mirror 8 an cut by the rear slit 17 does not occur. Accordingly, the loss of the laser light 11 decreases and the energy efficiency of the excimer laser device 1 is improved.

It is preferable to make the shape and size of the low transmission portion 29 smaller than the front opening portion 16A so that all the laser light 11D reflected at the low transmission portion 29 passes through the rear opening portion 17A. Thereby, the loss of the laser light 11 is minimized, and the energy efficiency is optimized. The size of the low transmission portion 29 may be approximately equal to that of the rear opening portion 17A as necessary.

The rear opening 17A is made smaller than the front opening 16A especially in terms of the lateral dimension in order that the end portion of the grating 23 avoids emission of the laser light 11. Accordingly, it may be suitable to form, for example, the low transmission portion 29 in the front mirror 8 to be a bar shape as the partial reflecting portion 26 in FIG. 6 to make the lateral width of the low transmission portion 29 smaller than the lateral width of the front opening 16A. The high transmission portion 30 may be formed on both left and right sides of the low transmission portion 29 as the total reflecting portion 27 in FIG. 6. By forming the high transmission portion 30 as above, manufacturing the front mirror 8 becomes easier compared with a case in which the low transmission portion 29 is formed in a rectangular shape.

Figure 12:
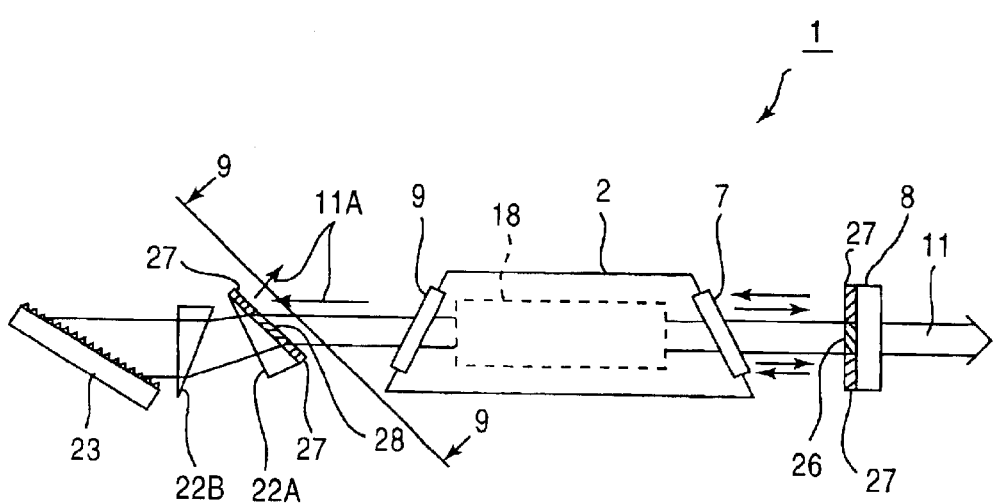
FIG. 12 is an explanatory view showing a configuration of an excimer laser device according to yet another embodiment.

In FIG. 12, the prism 22A includes both the function of an ordinary prism and the function of an optical element for shaping a beam form of the laser light into a desired form, like the rear slit 17 in FIG. 1, and the non-refractive portion 28 of the prism 22A is not a void such as an opening 17A of the slit. Thus, the prism 22A prevents the disadvantage where a portion of the slit close to the opening 17A is heated so as to vary the gas refractivity; thereby, the wave surface of the laser light is disturbed.

In the explanation of each of the aforementioned embodiments, the beam form is described to be a rectangle, but the application is possible to any form, such as a square, a circle, or an ellipse, and it is suitable to follow the demand of a processing unit. As for the laser device, the explanation is made for the excimer laser device 1, but it is also applicable to a fluorine laser device similarly. Further, as for the laser device, it is not limited to the discharge excitation laser device, but it is applicable to all the laser devices in which the beam forms are shaped with use of slits.

What is claimed is:

1. A laser device including an amplifying section in which a laser medium is amplified to oscillate laser light, comprising:

a prism having a solid non-reflective portion which is provided on approximately a center portion and transmits the laser light at high transmissivity, and a total reflecting portion which is provided outside a perimeter of said non-reflective portion and reflects the laser light at high reflectivity, wherein said prism separates part of the laser light oscillated in said amplifying section, and shapes a beam form of the laser light into a desired form to output the same, and a resonator having a partial reflecting front mirror which is provided at one side of said amplifying section, and a narrowing section composed of said prism and a grating which is provided at another side of said amplifying section, wherein said resonator is constituted by said front mirror and said grating so as to expand the laser light outputted from said amplifying section and input the laser light to said grating.

2. A laser device in accordance with claim 1, further comprising:

said front mirror having a partial reflecting portion which is provided on approximately a center portion and partially reflects the laser light, and a total reflecting portion which is provided outside a perimeter of said partial reflecting portion and reflects the laser light at high reflectivity, wherein said front mirror separates part of the laser light from said amplifying section, and shapes the beam form of the laser light into a desired form to output the same.

* * * * *